Patented Dec. 5, 1950

2,532,292

UNITED STATES PATENT OFFICE 2,532,292

DIARYLMETHYL ETHERS OF AMINO ALKANOLS

John W. Cusic, Skokie, Ill., assignor to G. D. Searle & Co., Skokie, Ill., a corporation of Illinois No Drawing. Application December 12, 1947, Serial No. 791,456

19 Claims. (Cl. 260—570)

This invention relates to diarylmethyl ethers of aminoalkanols wherein the amino group is substituted with a hydroxyalkyl radical, to salts of said compounds, and to processes for preparing the same. More particularly, my invention relates to compounds having the following general structural formula:

$$\begin{array}{c} Ar \\ \diagdown \\ Ar' \end{array} CH-O-Alk-N \begin{array}{c} R \\ \diagup \\ R' \end{array}$$

wherein Ar and Ar' are aromatic radicals, Alk is an alkylene radical, R is a hydroxyalkyl radical, and R' is hydrogen, alkyl or hydroxyalkyl, as well as to salts of such compounds.

It is an object of this invention to provide new chemical substances of the foregoing general formula which are useful in the medical and related arts. It is a further object of this invention to provide efficient manufacturing processes for such substances.

In the foregoing structural formula, the radicals Ar and Ar' are exemplified by aromatic hydrocarbon groups such as phenyl, tolyl, ethylphenyl, xylyl, naphthyl, xenyl and the like; by halogenated and alkoxylated aromatic hydrocarbon groups such as chlorophenyl, bromophenyl, anisyl and veratryl; and by heterocyclic radicals which are aromatic in character, including pyridyl, thienyl, pyrimidyl, thiazolyl and related radicals. Ar and Ar' can represent the same or different aromatic radicals.

The alkylene radical, Alk, represents a bivalent radical derived from a saturated hydrocarbon by the removal of hydrogen atoms from two different carbon atoms. It therefore includes such radicals as ethylene, propylene, trimethylene, tetramethylene, 1,2-butylene, 2,3-butylene, 1,3-butylene, the amylenes and higher bivalent aliphatic radicals.

The hydroxyalkyl radical, R, is chosen from groups such as $\beta$-hydroxyethyl, $\gamma$-hydroxypropyl, $\beta$-hydroxypropyl, $\beta$-hydroxyisopropyl, $\beta,\gamma$-dihydroxypropyl, $\gamma$-hydroxybutyl, $\beta$-hydroxybutyl, $\beta$-hydroxyisobutyl, $\delta$-hydroxybutyl, $\beta$-hydroxyamyl, $\beta$-hydroxyisoamyl and related hydroxylated radicals. The group R' represents hydrogen, hydroxyalkyl groups of the foregoing type, and lower alkyl radicals of one to six carbon atoms which may be straight or branched chained.

My invention is illustrated by the following compounds, which are representative of the substances within the scope of this application.

A. Benzohydryl $\beta$-(N-$\beta$-hydroxyethyl-n-hexylamino)ethyl ether $$\begin{array}{c} C_6H_5 \\ \diagdown \\ C_6H_5 \end{array} CH-O-CH_2CH_2-N \begin{array}{c} CH_2CH_2OH \\ \diagup \\ C_6H_{13} \end{array}$$

B. Benzohydryl $\gamma$-(N-$\beta$-hydroxyethyl-ethylamino)propyl ether $$\begin{array}{c} C_6H_5 \\ \diagdown \\ C_6H_5 \end{array} CH-O-CH_2CH_2CH_2-N \begin{array}{c} CH_2CH_2OH \\ \diagup \\ C_2H_5 \end{array}$$

C. Phenyltolylmethyl $\beta$-(N-$\beta$-hydroxypropyl-isobutylamino)propyl ether $$\begin{array}{c} C_6H_5 \\ \diagdown \\ CH_3-C_6H_4 \end{array} CH-O-CH_2\overset{CH_3}{\underset{}{C}H}-N \begin{array}{c} CH_2CHOHCH_3 \\ \diagup \\ CH_2CH(CH_3)_2 \end{array}$$

D. Phenylxenylmethyl $\gamma$-($\gamma$-hydroxypropylamino)-$\beta$-ethylpropyl ether $$\begin{array}{c} C_6H_5-C_6H_4 \\ \diagdown \\ C_6H_5 \end{array} CH-O-CH_2\overset{C_2H_5}{\underset{}{C}H}CH_2-N \begin{array}{c} CH_2CH_2CH_2OH \\ \diagup \\ H \end{array}$$

E. Anisylpyridylmethyl $\delta$-(N-$\beta$-hydroxyisopropyl-isopentylamino)butyl ether $$\begin{array}{c} CH_3OC_6H_4 \\ \diagdown \\ C_5H_4N \end{array} CH-O-CH_2CH_2CH_2CH_2N \begin{array}{c} \overset{CH_3}{\underset{}{C}HCH_2OH} \\ \diagup \\ CH_2CH_2CH(CH_3)_2 \end{array}$$

F. Bromophenylthienylmethyl $\gamma$-(N-$\beta,\gamma$-dihydroxypropyl-propylamino)butyl ether $$\begin{array}{c} BrC_6H_4 \\ \diagdown \\ C_4H_3S \end{array} CH-O-CH_2CH_2\overset{CH_3}{\underset{}{C}H}-N \begin{array}{c} CH_2CHOHCH_2OH \\ \diagup \\ C_3H_7 \end{array}$$

G. Phenylnaphthylmethyl $\beta$-(bis-$\beta$-hydroxyethylamino)isopropyl ether $$\begin{array}{c} C_6H_5 \\ \diagdown \\ C_{10}H_7 \end{array} CH-O-\overset{CH_3}{\underset{}{C}HCH_2}-N \begin{array}{c} CH_2CH_2OH \\ \diagup \\ CH_2CH_2OH \end{array}$$

H. Benzohydryl $\beta$-($\beta$-hydroxyisopropylamino)-ethyl ether $$\begin{array}{c} C_6H_5 \\ \diagdown \\ C_6H_5 \end{array} CH-O-CH_2CH_2-NH-\overset{}{\underset{CH_3}{C}H}CH_2OH$$

The compounds to which this invention relates are of use as therapeutic agents. They are in general antihistaminic, antiallergic and antispasmodic drugs. Certain of them have local anesthetic properties and some are of value in preventing anaphylaxis. The quaternary ammonium salts are surface active and have antiseptic qualities. The organic bases per se are of value as medicinal agents. These are high-boiling oils in general, and are soluble only in organic solvents.

In practice it is preferable to use these organic bases in the form of salts with non-toxic organic and inorganic acids, or as quaternary ammonium salts with reactive organic halides and esters. Among the acids which I have found of value for salt formation are hydrochloric, hydrobromic, hydriodic, sulfuric, phosphoric, tartaric, ascorbic, sulfamic, citric, acetic, lactic, maleic, malic, succinic, gluconic, benzoic, salicylic and the like. Reactive esters and halides which are suitable for quaternary salt formation include the alkyl halides such as methyl chloride, methyl iodide, ethyl bromide, propyl bromide, butyl chloride and n-butyl bromide; aralky halides such as benzyl bromide, benzyl chloride, naphthylmethyl chloride, phenethyl bromide, anisyl and veratryl chlorides; hydroxyalkyl halides as, for example, ethylene bromohydrin, propylene chlorohydrin, glycerol monochlorohydrin and δ-bromobutanol; esters such as dimethyl sulfate, diethyl sulfate, methyl p-toluenesulfonate, propyl benzenesulfonate and the like. Salts can also be formed by the addition of acidic xanthine compounds of the type of 8-chlorotheophylline, 8-bromotheophylline and related 8-halozanthines. The salts are free bases and are all useful substances; it is understood that in this application and appended claims reference to the bases is also meant to include acid addition and quaternary salts thereof.

The basic compounds which comprise my invention can be made by reacting a diarylmethyl haloalkyl ether of the formula:

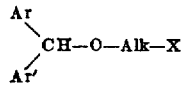

where Ar and Ar' represent aryl nuclei, Alk represents an alkylene chain and X represents a halogen, such as chlorine or bromine, with a primary or secondary amine of the type:

wherein R represents a hydroxyalkyl radical and R' represents hydrogen, hydroxyalkyl or alkyl. During the reaction the elements of hydrogen halide, HX, are split out and the desired base is obtained. The diarylmethyl haloalkyl ether used as a starting material can be obtained by reacting in the presence of alkali a diarylmethyl chloride or bromide with an alkylene halohydrin of the formula HO—Alk—X, where X is chlorine or bromine.

My invention is further disclosed by the following examples, which are provided merely for the purposes of illustration and which in no way are to be construed as limiting my invention in spirit or in scope. Relative quantities of materials are given in parts by weight.

*Example 1*

738 parts of β-chloroethyl benzohydryl ether, 450 parts of β-methylaminoethanol and 2600 parts of toluene are mixed and refluxed for four days. The reaction mixture is allowed to stand for a long time, during which an oily layer separates. The entire mass is extracted with dilute hydrochloric acid. The extracts are made alkaline and extracted with ether. The dried ether solutions are combined and evaporated, leaving a residue of β-(methyl-β-hydroxyethylamino)ethyl benzohydryl ether which distils at 192–195° centigrade at 3 millimeters' pressure.

14 parts of this base plus 11 parts of citric acid are dissolved in about 80 parts of hot isopropanol. Upon chilling a precipitate of the citric acid salt of β-(methyl-β-hydroxyethylamino)ethyl benzohydryl ether forms. It is separated by decantation and dissolved in hot isopropanol, from which it separates as a non-crystalline salt. This salt is readily soluble in water.

*Example 2*

25 parts of the base obtained in Example 1 and 20 parts of methyl iodide are dissolved in 38 parts of methyl ethyl ketone and allowed to stand in the cold. In the course of several hours a heavy precipitate of β-benzohydryloxyethyl-β-hydroxyethyl-dimethyl-ammonium iodide separates. This is removed, ground, filtered washed with ether and dried. It melts at 105–106° C.

*Example 3*

246 parts of β-chloroethyl benzohydryl ether and 178 parts of β-ethylaminoethanol are dissolved in 870 parts of toluene and refluxed for about four days. The reaction mixture is allowed to stand for an extended time. It is then extracted with dilute acid. The acid extracts are made alkaline and the organic material which separates is extracted with ether. The ether extracts are washed, dried and evaporated. The residue of β-(ethyl-β-hydroxy-ethylamino)ethyl benzohydryl ether distils at 202–205° C. at 3 mm. pressure. Treatment of the base with citric acid in isopropanol gives a non-crystalline citrate which is readily soluble in water.

*Example 4*

246 parts of β-chloroethyl benzohydryl ether, 122 parts of β-aminoethanol, and 80 parts of toluene are mixed and refluxed for four days. The mixture is extracted with dilute acid, the acid extracts are made alkaline and extracted with ether, and the ether extracts are dried and evaporated. β-(β-hydroxyethylamino)ethyl benzohydryl ether distils at 200–220° C. By reaction with citric acid there is obtained an amorphous citrate which is readily soluble in water.

*Example 5*

285 parts of β-(methyl-β-hydroxyethylamino)ethyl benzohydryl ether (Example 1) are dissolved in 105 parts of dry ether, and 78 parts of acetyl chloride are added gradually. After the addition the mixture is allowed to stand for one hour and then refluxed gently for one hour. Upon standing a solid precipitate of β-(methyl-β-acetoxyethylamino)ethyl benzohydryl ether hydrochloride separates. This is removed and recrystallized from isopropanol diluted with ether. It forms hygroscopic needles which melt at 87–89° C.

By a similar process using 154 parts of phenylacetyl chloride, there is obtained β-(N-β-phenylacetoxyethyl-methylamino)ethyl benzohydryl ether, which distils at 252–258° C. at 2 mm. pressure.

The corresponding benzoyl derivative is made in ether, using 145 parts of benzoyl chloride. It forms a crystalline hydrochloride.

The foregoing esters of hydroxyalkyl-alkylamino benzohydryl ethers and salts thereof disclosed in this example are claimed in my copending application Serial No. 185,319, filed September 16, 1950.

Example 6

21 parts of benzohydryl β-(N-β-hydroxyethyl-methylamino)ethyl ether (Example 1) and 20 parts of 8-chlorotheophylline are dissolved in the minimum amount of warm aqueous methyl ethyl ketone and filtered. The filtrate is chilled and crystals of the 8-chlorotheophylline salt of benzohydryl β-(N-β-hydroxyethyl-methylamino)ethyl ether separate. These are removed and dried, and melt at 225–230° C.

Example 7

A solution of 246 parts of β-chloroethyl benzohydryl ether, 225 parts of 2-aminopropanol, 1 part of sodium iodide and 1600 parts of 95% ethanol is refluxed for 2 days. The alcoholic solution is concentrated by evaporation and the residue is taken up in dilute hydrochloric acid. The acid solution is extracted with ether and then made alkaline. The alkaline solution is extracted with ether and this ether extract is dried with anhydrous potassium carbonate. The ether is evaporated and the residue of benzohydryl β-(1-hydroxy-2-propylamino)ethyl ether is distilled at 202–205° C. at 2 mm. pressure. The base is solid at room temperature, having a melting point of 71–72° C.

I claim:

1. A di-aromatic-substituted-methyl hydroxyalkylaminoalkyl ether, having the formula

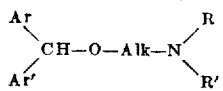

wherein Ar and Ar' are monocyclic aromatic radicals, Alk is a lower alkylene radical, R is a lower alkyl radical substituted with at least one hydroxyl group and R' is a member of the group consisting of hydrogen, lower alkyl and lower hydroxyalkyl radicals, and salts thereof.

2. A diarylmethyl hydroxyalkylaminoalkyl ether, having the formula

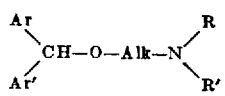

wherein Ar and Ar' are monocyclic aryl radicals, Alk is a lower alkylene radical, R is a lower alkyl radical substituted with at least one hydroxyl group and R' is a member of the group consisting of hydrogen, lower alkyl and lower hydroxyalkyl radicals, and salts thereof.

3. A diarylmethyl hydroxyalkylaminoalkyl ether, having the formula

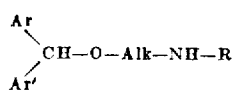

wherein Ar and Ar' are monocyclic aryl radicals, Alk is a lower alkylene radical and R is a lower alkyl radical substituted with at least one hydroxyl group, and salts thereof.

4. A diarylmethyl hydroxyalkylaminoalkyl ether, having the formula

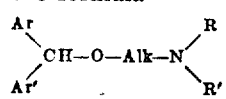

wherein Ar and Ar' are monocyclic aryl radicals, Alk is a lower alkylene radical, R is a lower alkyl radical substituted with at least one hydroxyl group and R' is a lower alkyl radical, and salts thereof.

5. A diarylmethyl hydroxyalkylaminoalkyl ether, having the formula

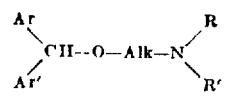

wherein Ar and Ar' are monocyclic aryl radicals, Alk is a lower alkylene radical, and R and R' are lower alkyl radicals, each substituted with at least one hydroxyl group, and salts thereof.

6. A benzohydryl hydroxyalkylaminoalkyl ether, having the formula

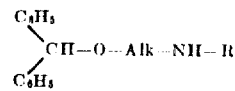

wherein Alk is a lower alkylene radical and R is a lower alkyl radical substituted with at least one hydroxyl group, and salts thereof.

7. A benzohydryl hydroxyalkylaminoalkyl ether, having the formula

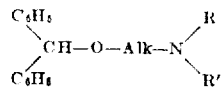

wherein Alk is a lower alkylene radical, R is a lower alkyl radical substituted with at least one hydroxyl group and R' is an alkyl radical, and salts thereof.

8. A benzohydryl hydroxyalkylaminoalkyl ether, having the formula

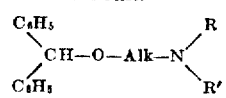

wherein Alk is a lower alkylene radical, and R and R' are lower alkyl radicals each substituted with at least one hydroxyl group, and salts thereof.

9. A benzohydryl β-hydroxyethylaminoalkyl ether, having the formula

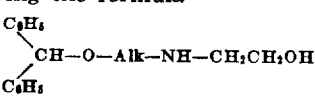

wherein Alk is a lower alkylene radical, and salts thereof.

10. A benzohydryl β-hydroxyethylaminoalkyl ether, having the formula

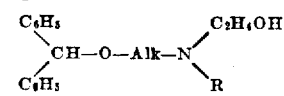

wherein Alk is a lower alkylene radical and R is a lower alkyl radical, and salts thereof.

11. A benzohydryl β-hydroxyethylaminoalkyl ether, having the formula

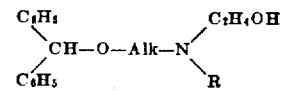

wherein Alk is a lower alkylene radical and R is a lower hydroxyalkyl radical, and salts thereof.

12. A benzohydryl bis(β-hydroxyethyl)aminoalkyl ether, having the formula

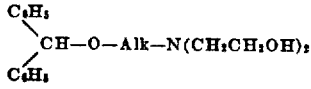

wherein Alk is a lower alkylene radical, and salts thereof.

13. Benzohydryl β-(β-hydroxyethylamino)ethyl ether and salts thereof.

14. Benzohydryl β-(β-hydroxyethylamino)ethyl ether citrate.

15. Benzohydryl β-(N-β-hydroxyethyl-methylamino)ethyl ether and salts thereof.

16. Benzohydryl β-(N-β-hydroxyethyl-methylamino)ethyl ether salt of 8-chlorotheophylline.

17. The process of preparing a compound of the formula

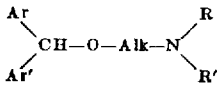

wherein Ar and Ar' are monocyclic aromatic radicals, Alk is a lower alkylene radical, R is a lower alkyl radical substituted with at least one hydroxyl group and R' is a member of the group consisting of hydrogen, lower alkyl and lower hydroxyalkyl radicals, which comprises heating a compound of the formula

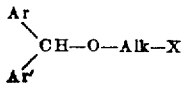

wherein X is halogen, with an atertiary lower hydroxyalkylamine in an inert solvent, and isolating the product so formed.

18. The process of preparing a benzohydryl β-hydroxyethylamino(lower alkyl)ether which comprises heating a benzohydryloxy(lower alkyl)-halide with an atertiary β-hydroxyethylamine in an inert solvent, and isolating the product so formed.

19. The process of preparing benzohydryl β-(β-hydroxyethyl-methylamino)ethyl ether which comprises heating β-chloroethyl benzohydryl ether with β-methylaminoethanol in toluene, and isolating the product so formed.

JOHN W. CUSIC.

REFERENCES CITED

The following references are of record in the file of this patent:

UNITED STATES PATENTS

| Number | Name | Date |
|---|---|---|
| 2,397,799 | Martin et al. | Apr. 2, 1946 |
| 2,421,714 | Rieveschl | June 3, 1947 |
| 2,427,878 | Rieveschl | Sept. 23, 1947 |